United States Patent
Livanos et al.

(10) Patent No.: US 10,581,984 B2
(45) Date of Patent: Mar. 3, 2020

(54) METHODS AND APPARATUS FOR PROVIDING INFORMATION ASSOCIATED WITH NETWORK FUNCTION (NF) INSTANCES OF A 5G MOBILE NETWORK

(71) Applicant: Cisco Technology, Inc., San Jose, CA (US)

(72) Inventors: Konstantin Livanos, Naperville, IL (US); Robert Glenn Smith, Voisins le Bretonneux (FR); Ian McDowell Campbell, Littleton, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/042,828

(22) Filed: Jul. 23, 2018

(65) Prior Publication Data

US 2020/0028920 A1    Jan. 23, 2020

(51) Int. Cl.
  *H04M 3/42* (2006.01)
  *H04L 29/08* (2006.01)
  *H04W 8/18* (2009.01)
  *H04W 48/18* (2009.01)
  *H04W 48/16* (2009.01)
  *H04W 8/26* (2009.01)
  *H04W 48/08* (2009.01)

(52) U.S. Cl.
  CPC .......... *H04L 67/16* (2013.01); *H04L 67/142* (2013.01); *H04W 8/18* (2013.01); *H04W 8/26* (2013.01); *H04W 48/16* (2013.01); *H04W 48/18* (2013.01); *H04W 48/08* (2013.01)

(58) Field of Classification Search
  CPC ...................................................... H04W 8/18
  See application file for complete search history.

(56) References Cited

U.S. PATENT DOCUMENTS

2017/0303259 A1* 10/2017 Lee .................. H04W 28/16
2017/0332421 A1* 11/2017 Sternberg ............ H04W 76/11
(Continued)

FOREIGN PATENT DOCUMENTS

WO    2018024121 A1    2/2018
WO    2018090677 A1    5/2018

OTHER PUBLICATIONS

"3rd Generation Partnership Project; Technical Specification Group Services and System Aspects; System Architecture for the 5G System; Stage 2 (Release 15)"; 3GPP TS 23.501 V1.2.0 (Jul. 2017); pp. 1-166.
(Continued)

*Primary Examiner* — Shantell L Heiber

(57) ABSTRACT

A network function (NF) profile repository function (NPRF) is provided to receive, for each one of a plurality of NF instances of a plurality of different NF types, information associated with the NF instance and store the information in memory. The NPRF may then also receive, from an NF repository function (NRF), a message which indicates a request for information associated with one or more NF instances of an indicated NF type. In response, the NPRF may retrieve, from the memory based on the indicated NF type, information associated with the one or more NF instances. The NPRF may send, to the NRF, a message which indicates a response to the request, where the response includes retrieved information associated with the one or more NF instances.

20 Claims, 17 Drawing Sheets

(56) References Cited

U.S. PATENT DOCUMENTS

| | | | |
|---|---|---|---|
| 2018/0124175 A1 | 5/2018 | Li et al. | |
| 2018/0124594 A1* | 5/2018 | Kelly | H04W 8/20 |
| 2018/0139107 A1* | 5/2018 | Senarath | H04L 41/5003 |
| 2018/0199279 A1* | 7/2018 | Baek | H04W 48/18 |
| 2018/0324646 A1* | 11/2018 | Lee | H04W 36/0016 |
| 2018/0359795 A1* | 12/2018 | Baek | H04W 76/12 |

OTHER PUBLICATIONS

Partial International Search Report in counterpart International Application No. PCT/US2019/041907, dated Sep. 30, 2019, 12 pages.

International Search Report and Written Opinion in counterpart International Application No. PCT/US2019/041907, dated Nov. 22, 2019, 19 pages.

\* cited by examiner

602A

| NPRF Services |
| --- |
| Nnprf-ProfileUpload-Request |
| Nnprf-ProfileUpdate-Request |
| Nnprf-ProfileRemove-Request |
| Nnprf-NFProfile-Request |
| Nnprf-NFservicelist-Request |
| Nnprf-NFloadstatus-Request |
| Nnprf-availability-Request |
| Nnprf-SliceLoadStatus-Request |

E.g. Services exposed/provided at
NF Profile Repository Function (NPRF)

| NBEF Services |
| --- |
| Nnbef-ServingNodeDiscovery |
| Nnbef-List ServingNodesDiscovery |
| Nnbef-ProxyUnSolicatedRequest |
| Nnbef-ProxyOnDemandRequest |
| Nnbef-PCFDiscovery |

E.g. Services exposed/provided at
NF Bindings Exposure Function (NBEF)

| IDENTIFICATION INFO |
|---|
| NF Name |
| NF ID |
| NF Instance ID |

E.g. Identification information for NF Instance maintained at NPRF

| SERVICE INFO |
|---|
| NF Service 1 |
| NF Service 2 |
| NF Service 3 |
| ⋮ |

E.g. Service information for NF Instance maintained at NPRF

| STATUS INFO |
|---|
| Availability Status |
| Load Status |

E.g. Status information for NF Instance maintained at NPRF

FIG. 9

(see e.g. Fig.14)

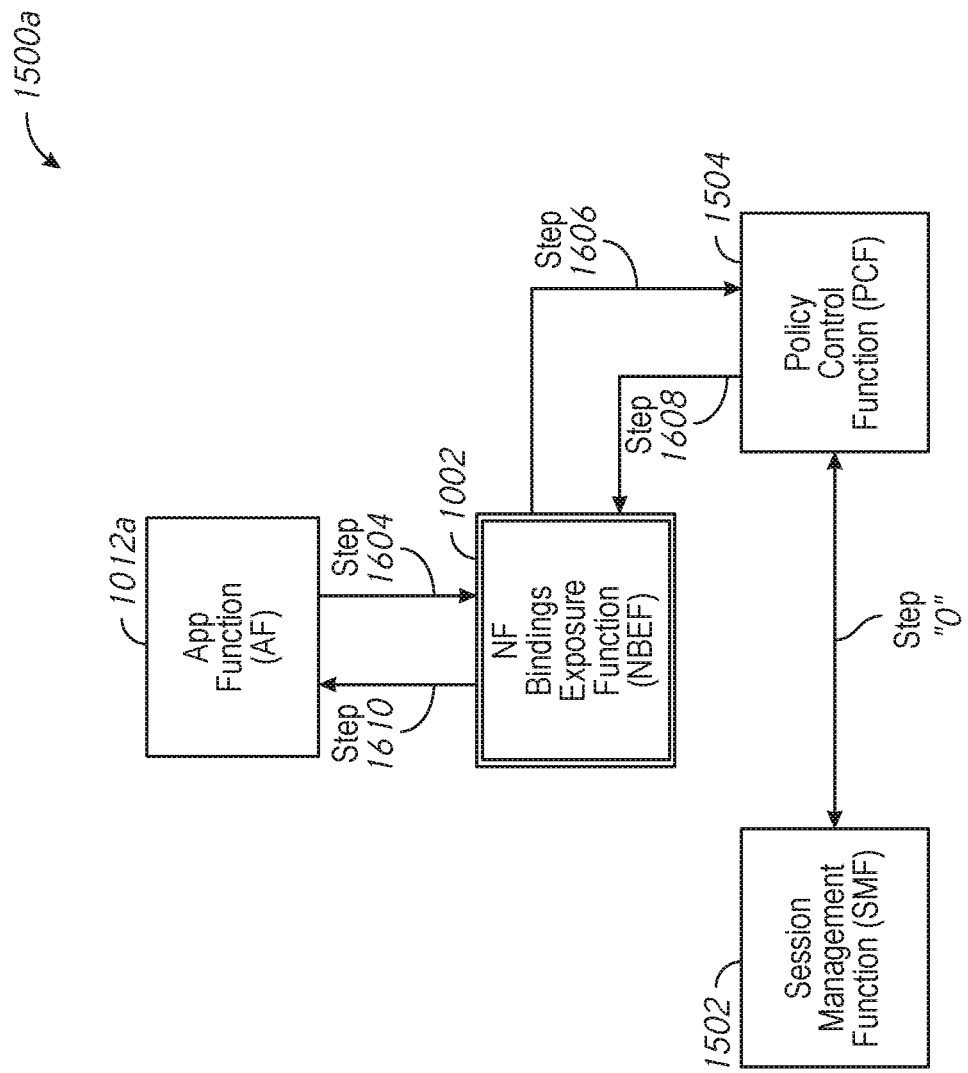

(See e.g. Fig.16)

METHODS AND APPARATUS FOR PROVIDING INFORMATION ASSOCIATED WITH NETWORK FUNCTION (NF) INSTANCES OF A 5G MOBILE NETWORK

TECHNICAL FIELD

The present disclosure relates generally to techniques for providing information associated with network function (NF) instances of a 5G mobile network, for use in facilitating communications for UEs operating in the 5G mobile network.

BACKGROUND

There is a need to more easily provide information associated with network function (NF) instances in a 5G mobile network, for use in facilitating communications for user equipment (UE) operating in the 5G mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3), in cooperation with an NF repository function (NRF) in the method of FIG. 5, according to some implementations of the present disclosure;

FIG. 3), in cooperation with the NPRF in the method of FIG. 4, according to some implementations of the present disclosure;

FIG. 6A is an illustrative example of services (e.g. functions) which may be exposed or provided by an NPRF, and FIG. 6B is an illustrative example of services (e.g. functions) which may be exposed or provided by an NF bindings exposure function (NBEF) (see e.g.

FIGS. 7, 8, and 9 are illustrative examples of information associated with NF instances which may be stored and maintained at an NPRF, where the information may include identification information of an NF instance (FIG. 7), service information of an NF instance (FIG. 8), and status information of an NF instance (FIG. 9);

FIG. 10 is an illustrative representation of an arrangement of network node functions for use in the 5G mobile network, which include a NF bindings exposure function (NBEF) for use in providing information associated with NF instances according to some implementations of the present disclosure (see e.g. the method of FIG. 11);

FIG. 10) according to some implementations of the present disclosure;

FIG. 13), in cooperation with an NBEF, according to some implementations of the present disclosure;

FIGS. 15A and 15B are illustrative representations of arrangements of network node functions of the 5G mobile network, which include an NBEF for use in providing information associated with NF instances according to some implementations of the present disclosure (see e.g. the method of FIG. 16);

FIGS. 15A and 15B)

Figure 1A:
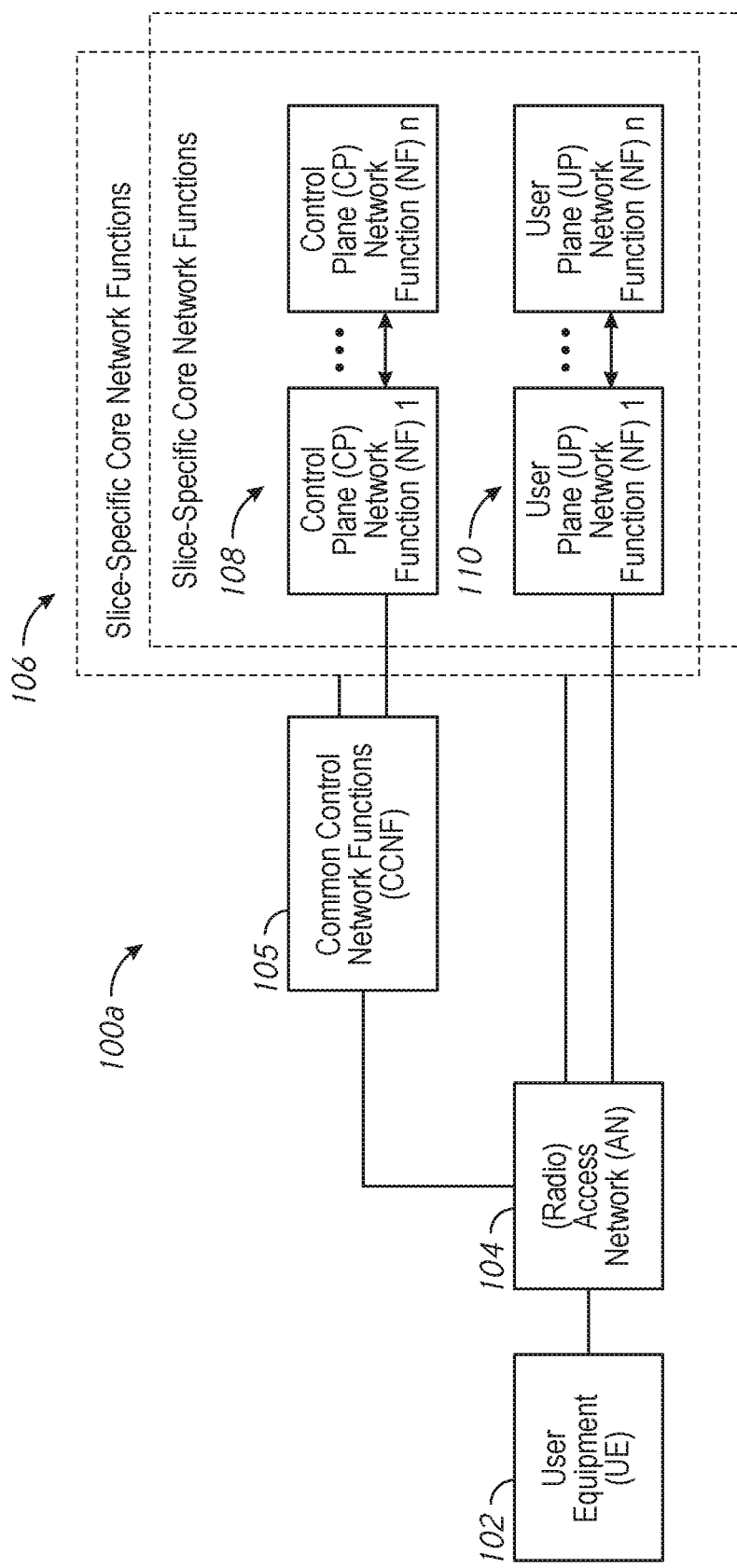
FIG. 1A is an illustrative representation of a basic network architecture of a Fifth Generation (5G) mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for providing information (e.g. identification, service, status, and/or bindings information) associated with network function (NF) instances in a 5G mobile network, for use in facilitating communications for user equipment (UE) in the 5G mobile network, are described herein.

In one illustrative example, an NF profile repository function (NPRF) is provided to receive, for each one of a plurality of NF instances of a plurality of different NF types, information associated with the NF instance and store the information in memory (e.g. a database). The different NF types of NF instances may include, for example, an access and mobility management function (AMF), a session management function (SMF), and a policy control function (PCF). The NPRF may then receive, from an NF repository function (NRF), a message which indicates a request for information associated with one or more NF instances of an indicated NF type. In response, the NPRF may retrieve, from the memory based on the indicated NF type, information associated with the one or more NF instances. The NPRF may send, to the NRF, a message which indicates a response to the request, where the response includes retrieved information associated with the one or more NF instances. In some implementations, information for each NF instance may be or include identification information which indicates an NF instance identifier (ID) of the NF instance, one or more service indications each indicative of a service provided by the NF instance, an availability indication which indicates a current availability of the NF instance, and/or a loading indication which indicates a current loading of the NF instance.

In another illustrative example, an NF bindings exposure function (NBEF) is alternatively or additionally provided in the 5G mobile network. The NBEF may receive information associated with a binding between a user equipment (UE) and a serving network function (NF) instance of the UE and store this information in memory (e.g. a database), for each one of a plurality of such bindings between UEs and serving NF instances. The NBEF may also receive, from a requesting NF, a message which indicates a request for information associated with a serving NF instance of a UE, where the request includes a UE identifier of the UE. The NBEF may retrieve, from the memory based on the UE identifier, information associated with the serving NF instance of the UE. The NBEF may send, to the requesting NF, a message which indicates a response to the request, where the response includes the information associated with the NF instance. The information may be or include identification information of the serving NF instance and domain name information (e.g. a fully qualified domain name or FQDN) of the serving NF instance.

More detailed implementations of providing such information for facilitating communications for UEs are described below.

EXAMPLE EMBODIMENTS

FIG. 1A is an illustrative representation of a network architecture 100a of a 5G mobile network configured to facilitate communications for user equipment (UE) 102. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
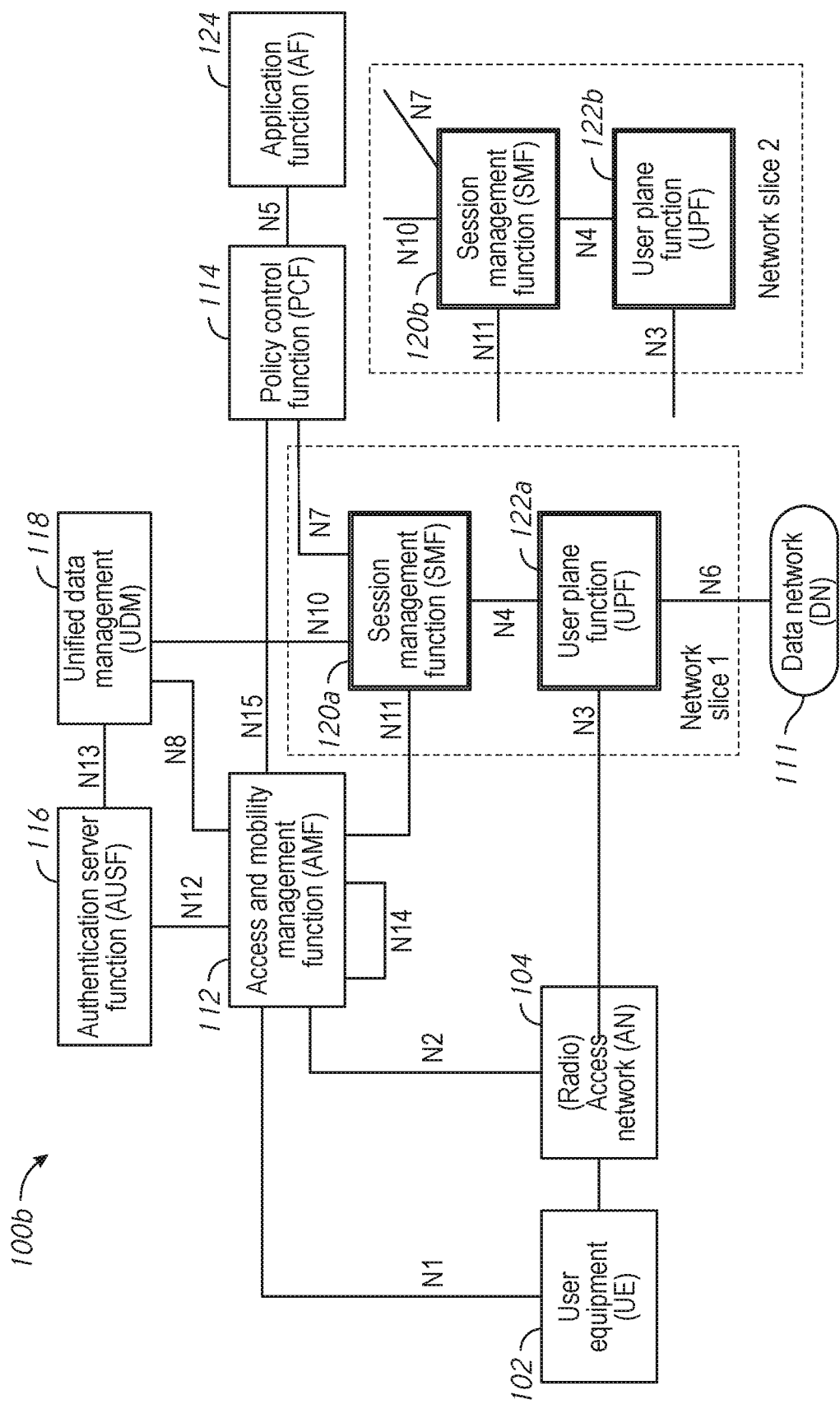
FIG. 1B is an illustrative representation of a more detailed network architecture of the 5G mobile network of FIG. 1A.

FIG. 1B is an illustrative representation of a more detailed network architecture 100b of the 5G mobile network of FIG. 1A. As provided in 3GPP standards for 5G (e.g. 3GPP 23.501 and 23.502), network architecture 100b for the 5G mobile network may include an authentication server function (AUSF) 116, a unified data management (UDM) 118 (having a unified data repository or UDR), an AMF 112, a policy control function (PCF) 114, an SMF 120a, and a UPF 122a. A plurality of interfaces or reference points N1 through N15 shown in FIG. 1B may define the communications and/or protocols between each of the entities, as described in the relevant (evolving) standards documents. One or more application functions, such as an application function (AF) 124, may connect to the 5G mobile network via PCF 114. One or more data networks (DN) 111 having application servers (AS) may be connected to the 5G mobile network through UPFs such as UPF 122a.

UPF 122a is part of the user plane and all other NFs (i.e. AMF 112, SMF 120a, PCF 114, AUSF 116, and UDM 118) are part of the control plane. Separating user and control planes guarantees that each plane resource to be scaled independently. It also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

Figure 2:
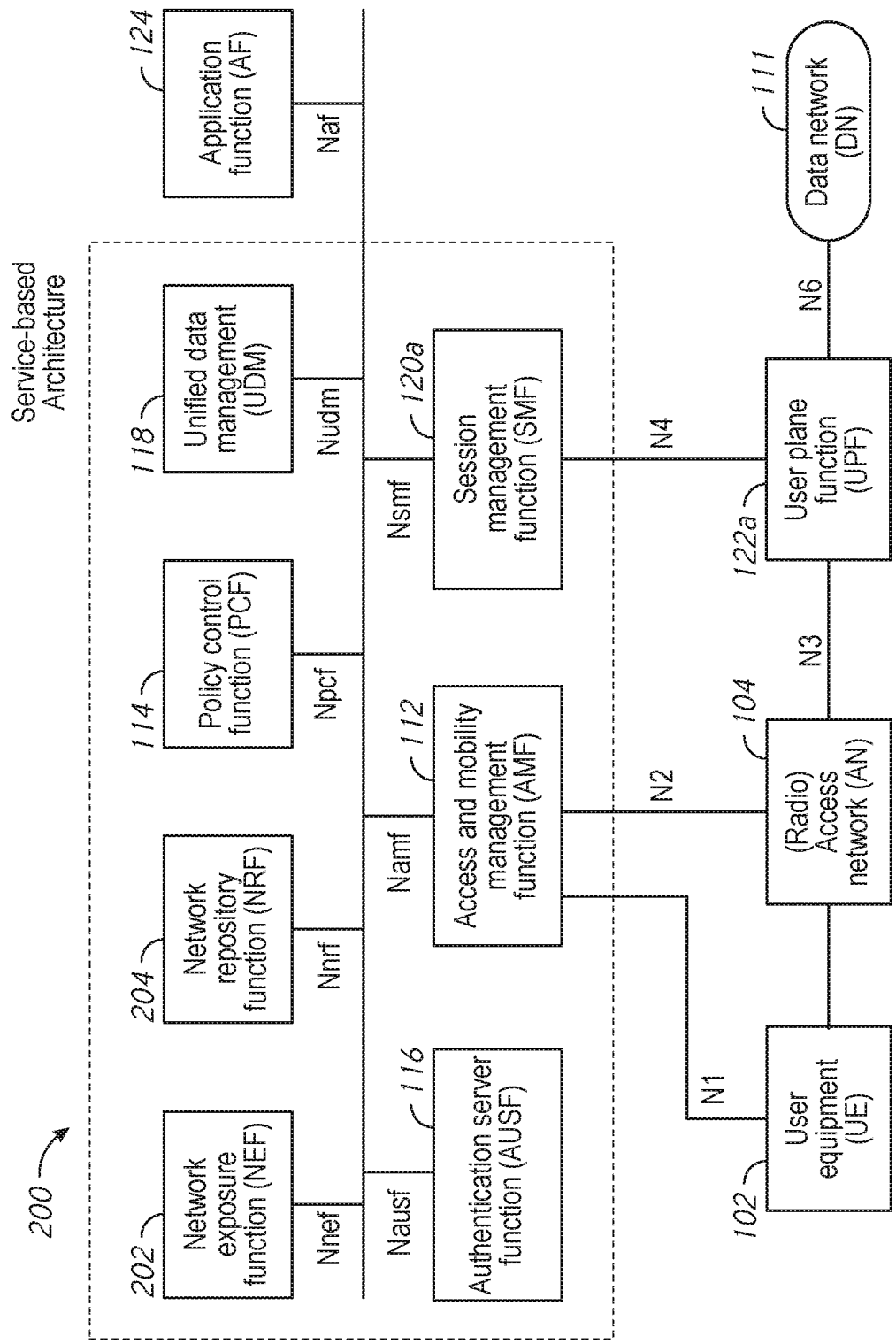
FIG. 2 is an illustrative representation of a service-based architecture of the 5G mobile network described in relation to FIGS. 1A-1B.

In FIG. 2, a service-based architecture 200 of the 5G mobile network of FIGS. 1A-1B is illustrated. Network6k node functions in the service-based architecture 200 of FIG. 2, not shown in FIGS. 1A-1B, include a network exposure function (NEF) entity 202 and an NF repository function (NRF) 204. A plurality of interfaces N1 through N6, as well as interfaces $N_{nef}$, $N_{nrf}$, $N_{pcf}$, $N_{udm}$, $N_{ausf}$, $N_{amf}$, $N_{smf}$, and $N_{af}$, may define the communications and/or protocols between each of the entities, as described in the relevant (evolving) standards.

In the context of the 5G mobile network of FIGS. 1A, 1B, and 2 above, there is a need to more easily provide and facilitate the communication of information associated with NF instances (e.g. identification, service, status, and/or binding information of NF instances), for use in facilitating communication for UEs in the 5G mobile network.

Figure 3:
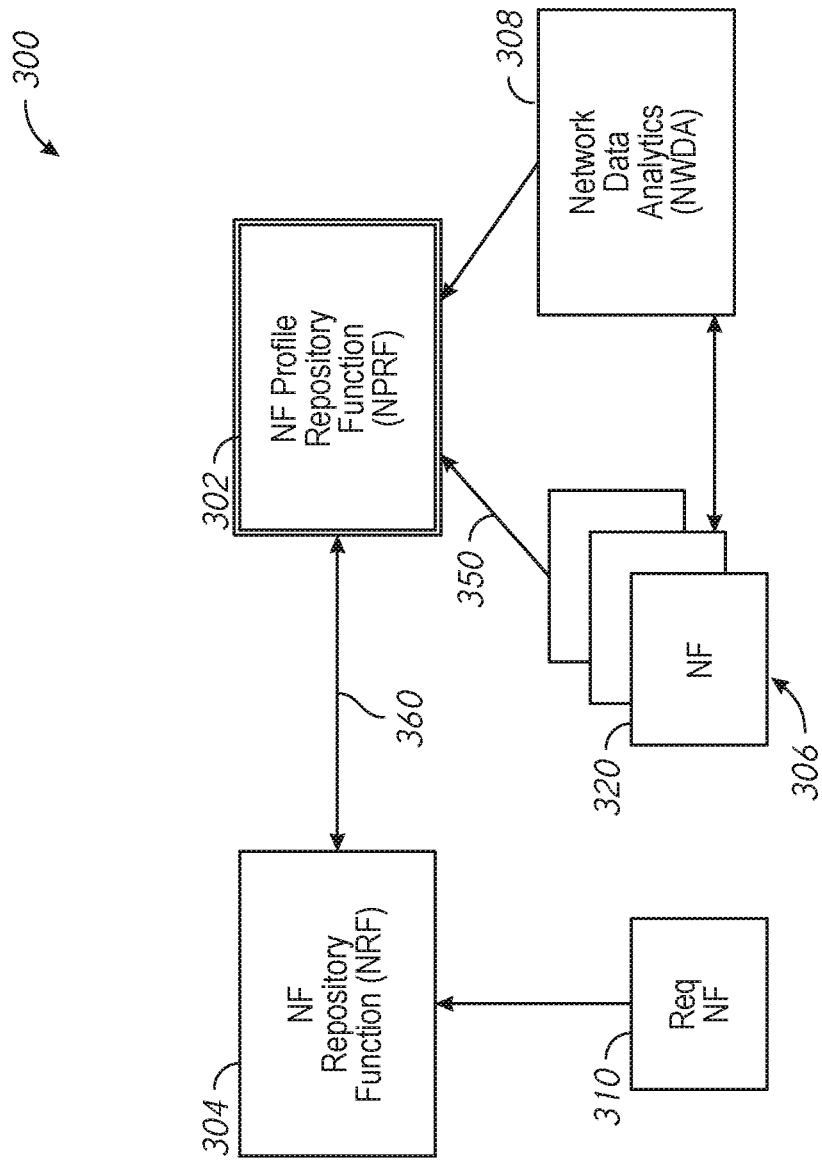
FIG. 3 is an illustrative representation of an arrangement of network node functions for use in a 5G mobile network, including a network function (NF) profile repository function (NPRF) in communication with a network repository function (NRF), for use in providing information associated with NF instances according to some implementations of the present disclosure (see e.g. the method of FIGS. 4 and 5)

FIG. 3 is an illustrative representation of an arrangement of network node functions 300 for use in a 5G mobile network. The arrangement of network node functions 300 include a network function (NF) profile repository function (NPRF) 302, in communication with NRF 304, for use in providing information associated with NF instances according to some implementations of the present disclosure. NPRF 302 may operate in accordance with the technique of FIG. 4, providing the enhanced services (e.g. functions) described in relation to FIG. 6A and information of FIGS. 7, 8, and 9, each of which are described below in detail.

In FIG. 3, the arrangement of network node functions 300 include the NPRF 302 as well as an NF repository function (NRF) 304, a network data analytics (NWDA) 308, and a plurality of NFs 306 (e.g. NF 320, as well as a requesting NF 310). An interface 350 (e.g. an NPRF-NF interface) may be provided between NPRF 302 and an NF 320, and an interface 360 (e.g. an NPRF-NRF interface) may be provided between NPRF 302 and NRF 304. Note that the NRF 304 and other NFs 306 correspond to those described earlier in relation to FIGS. 1A-1B and 2, with extended functionality as described herein. Extended functionality of NRF 304 is described later below in relation to the technique of FIG. 5.

Figure 4:
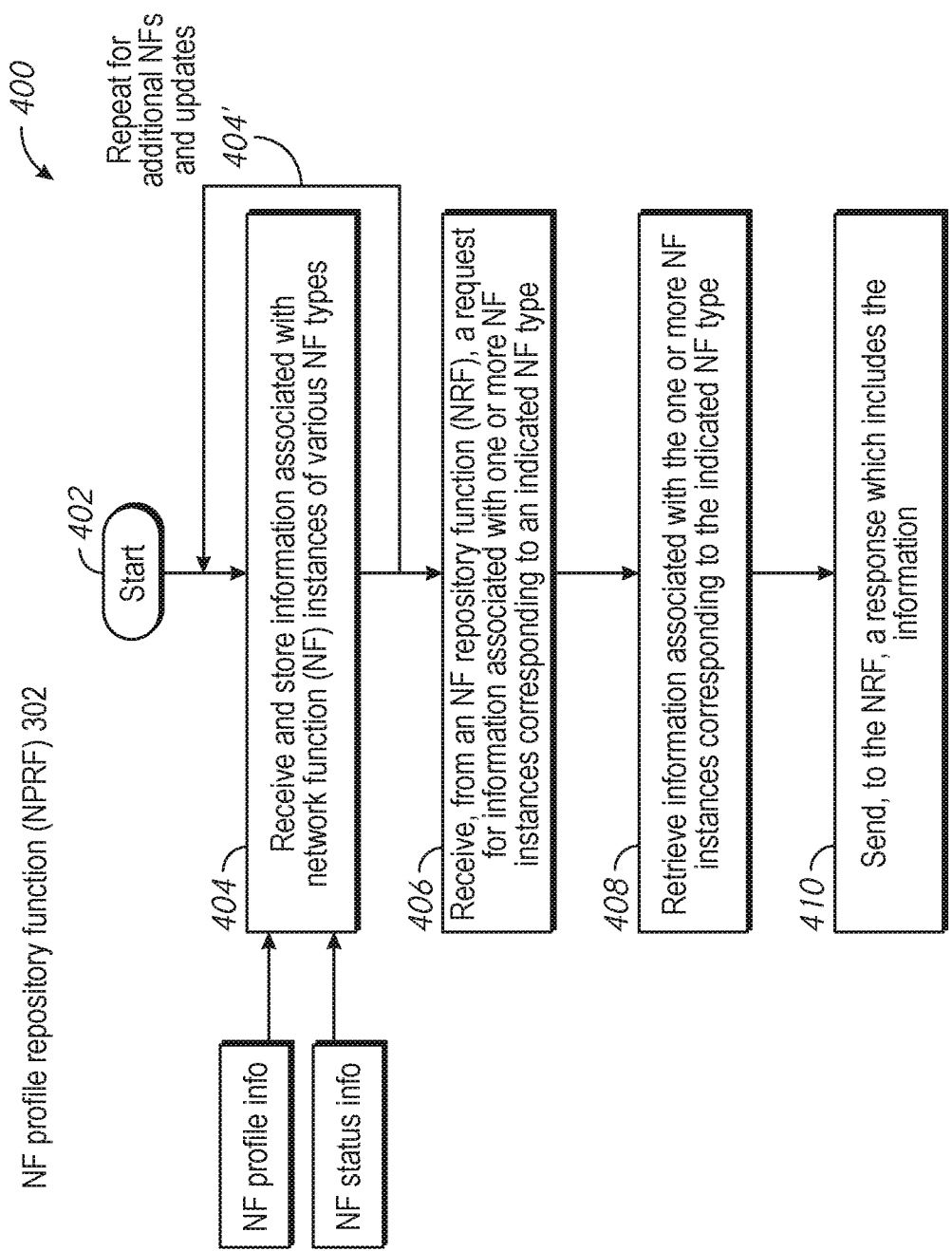
FIG. 4 is a flowchart for describing a method of providing information associated with NF instances for use in the 5G mobile network, which may be performed by an NPRF (see e.g.

FIG. 4 is a flowchart 400 for describing a method of providing information associated with NF instances of a 5G mobile network. The method may be embodied as and/or performed by an NPRF (e.g. NPRF 302 of FIG. 3). The NPRF may perform the method together with the method of the NRF as described below in relation to FIG. 5. The method may be executed on a server, network device, or network equipment in the 5G mobile network. The method may be further embodied as a computer program product including a non-transitory computer readable medium and instructions stored in the computer readable medium where the instructions are executable on one or more processors of the server, network device, or network equipment for performing the steps of the method.

Beginning at a start block 402 of FIG. 4, the NPRF may receive information associated with an NF instance and store the information in memory (e.g. a database) (step 404 of FIG. 4). The receiving and storing may be performed for each one of a plurality of NF instances of a plurality of different NF types, over time. The different NF types may include, as examples, an AMF type, an SMF type, and a PCF type. The NPRF may repeatedly receive and store one or more updates of such information for each NF instance over time (step 404' of FIG. 4), and thus continually maintain current, up-to-date information for each NF instance The information for each NF instance may be or include profile information of the NF instance, which may be or include identification information which indicates an NF instance identifier (ID) of the NF instance, one or more service indications each indicative of a service provided by the NF instance, an availability indication which indicates a current availability of the NF instance, and/or a loading indication which indicates a current loading of the NF instance.

In general, the NRF 304 may request and receive, from the NPRF, information associated with one or more NF instances. Here, the NPRF may receive, from the NRF, a message which indicates a request for information associated with one or more NF instances of an indicated NF type (e.g. an AMF type, an SMF type, or a PCF type) (step 406 of FIG. 4). In response, the NPRF may retrieve, from the memory based on the indicated NF type, information associated with one or more (e.g. known and available) NF instances of the indicated NF type (step 408 of FIG. 4). The NPRF may send, to the NRF, a message which indicates a response to the request, where the response includes at least some of the retrieved information associated with the one or more NF instances (step 410 of FIG. 4).

In some implementations of step 410, the one or more NF instances of the indicated NF type are a plurality of NF instances, and the information for each NF instance includes at least identification information for identifying the NF instance. Here, the NRF may perform an NF selection procedure (e.g. on behalf of a requesting NF, such as an AMF or an SMF) for selecting one of the NF instances for use as a serving NF instance for a data session for a UE.

Figure 5:
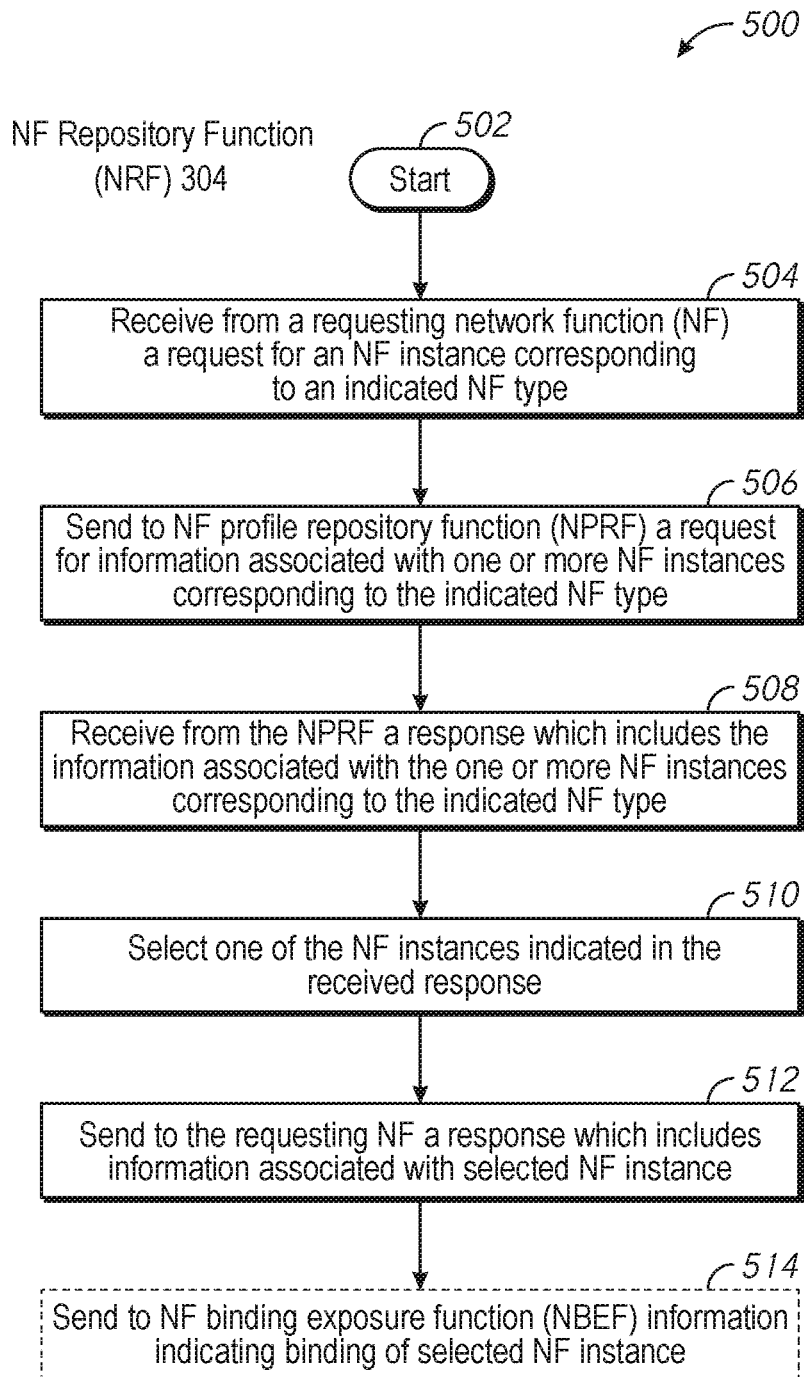
FIG. 5 is a flowchart for describing a method of providing information associated with NF instances for use in the 5G mobile network, which may be performed by the NRF (see e.g.

FIG. 5 is a flowchart 500 for describing a method for use in providing information associated with NF instances for use in a 5G mobile network. The method may be embodied as and/or performed by an NRF (e.g. NRF 304 of FIG. 3). The NRF may perform the method together with the method of the NPRF as previously described in relation to FIG. 4. The method may be executed on a server, network device, or network equipment in the 5G mobile network. The method may be further embodied as a computer program product including a non-transitory computer readable medium and instructions stored in the computer readable medium where the instructions are executable on one or more processors of the server, network device, or network equipment for performing the steps of the method.

Beginning at a start block 502 of FIG. 5, the NRF may receive a message from a requesting NF, where the message indicates a discovery request for an NF instance corresponding to an indicated NF type (step 504 of FIG. 5). The indicated NF type may be, for example, one of an AMF, an SMF, or a PCF. The NRF may send, to a repository function, a message which indicates a request for information associated with one or more NF instances corresponding to the indicated NF type (step 506 of FIG. 5). The repository function may be, for example, a network profile repository function or "NPRF" (e.g. NPRF 302 of FIG. 3). The NRF may receive, from the repository function, a message which indicates a response to the request, where the response includes the information associated with the one or more NF instances corresponding to the indicated NF type (step 508 of FIG. 5). The one or more NF instances may be a plurality of NF instances.

The information for each NF instance may be or include profile information of the NF instance, which may be or include identification information which indicates an NF instance ID of the NF instance, one or more service indications each indicative of a service provided by the NF instance, an availability indication which indicates a current availability of the NF instance, and/or a loading indication which indicates a current loading of the NF instance.

The NRF may select one of the NF instances indicated in the received response based on the information received from the repository function (step 510 of FIG. 5). The selection may be performed with use of an NF selection procedure (e.g. an AMF selection or SMF selection procedure). The NRF may select a given NF instance, for example, when it provides the appropriate services, it is available (in contrast to being unavailable), and it is not congested (in contrast to congested). The NRF may send to the requesting NF a message which indicates a discovery response to the discovery request, where the message includes the information associated with the selected NF instance corresponding to the indicated NF type (step 512 of FIG. 5).

Note that the selected NF instance may be for use as a serving NF instance of a user equipment (UE) in the 5G mobile network, wherein a binding between the selected NF instance and the UE is established. Thus, in some implementations, the NRF may further send, to an NF bindings exposure function (NBEF), information associated with the binding between the selected NF instance and the UE (step 514 of FIG. 5) (see e.g. the discussion in relation to FIGS. 10 and 11 below).

FIGS. 7, 8, and 9 show examples of information associated with NF instances which may be stored and maintained at an NPRF, where the information is or includes identification information of an NF instance (FIG. 7), service information of an NF instance (FIG. 8), status information of an NF instance (FIG. 9), or any combination of the above.

Identification information may include or more identification indications (see e.g. identification information 702 of FIG. 7 which includes one or more of an NF name indicating a name of the NF instance, an NF identifier (ID) indicative of an ID of the NF, and an NF instance ID indicative of an ID of the NF instance). The identification information may be provided to the NPRF from the NF instance itself, for example, via a profile upload or update.

Service information may include one or more service indications each being indicative of a service (e.g. function) provided by the NF instance (see e.g. service information 802 of FIG. 8 which includes a list of available services (e.g. functions) from a set of possible services (e.g. functions) 602A listed in FIG. 6A). Service information may be provided to the NPRF from the NF instance itself, for example, via a profile upload or update. As shown in FIG. 6A, the set of possible services (e.g. functions) 602A from an NPRF may include an Nnprf-ProfileUpload-Request for uploading a profile of an NF; an Nnprf-ProfileUpdate-Request for updating an existing profile of an NF; an Nnprf-ProfileRemove-Request for removing an existing profile of an NF; an Nnprf-NFProfile-Request for requesting a profile of an NF; an Nnprf-NFservicelist-Request for obtaining a list of services of an NF; an Nnprf-NFloadstatus-Request for receiving a load status of an NF; an Nnprf-availability-Request for receiving an availability status of an NF; and an Nnprf-SliceLoadStatus-Request for receiving a load status of a network slice.

Status information may include an availability indication which indicates a current availability of the NF instance (see e.g. status information 902 of FIG. 9, indicating "availability status"). The availability indication may be provided to the NPRF from the NF instance itself or, alternatively, from the NWDA (e.g. NWDA 308 of FIG. 3). Status information may additionally or alternatively include a loading indication which indicates a current loading of the NF instance (see e.g. status information 902 of FIG. 9, indicating "load status"). The loading indication may be provided to the NPRF from the NWDA.

Moving on, a NF bindings exposure function (NBEF) 1002 may be additionally or alternatively provided in the 5G mobile network, and illustrated in the example arrangements of FIGS. 10, 12, 13, and 15A-15B. NBEF 1002 may operate in accordance with the example techniques described in relation to FIGS. 11, 14, and 16, and with the NPRF 302 as in FIG. 5.

In general, NBEF 1002 may be configured to store bindings information associated with bindings between UEs and their serving NF instances, and provide such bindings information to requesting entities in the network. With reference now to FIG. 6B, an illustrative example of more specific services (e.g. functions) 602B which may be exposed or provided by NBEF 1002 is shown. The set of possible services 602B for an NBEF includes an Nnbef-ServingNodeDiscovery for an NF instance to request discovery of a serving node of a given UE; an NnbeListServingNodesDiscovery for an NF instance to request discovery of a list of serving nodes for a given UE; Nnbef-ProxyUnSolicitedRequest for proxying a request to the serving NF; an Nnbef-ProxyOnDemandRequest for proxying a request to the serving NF with an explicit indication to do so; and an Nnbef-PCFDiscovery for discovering the PCF service the UE's PDU session.

Figure 10:
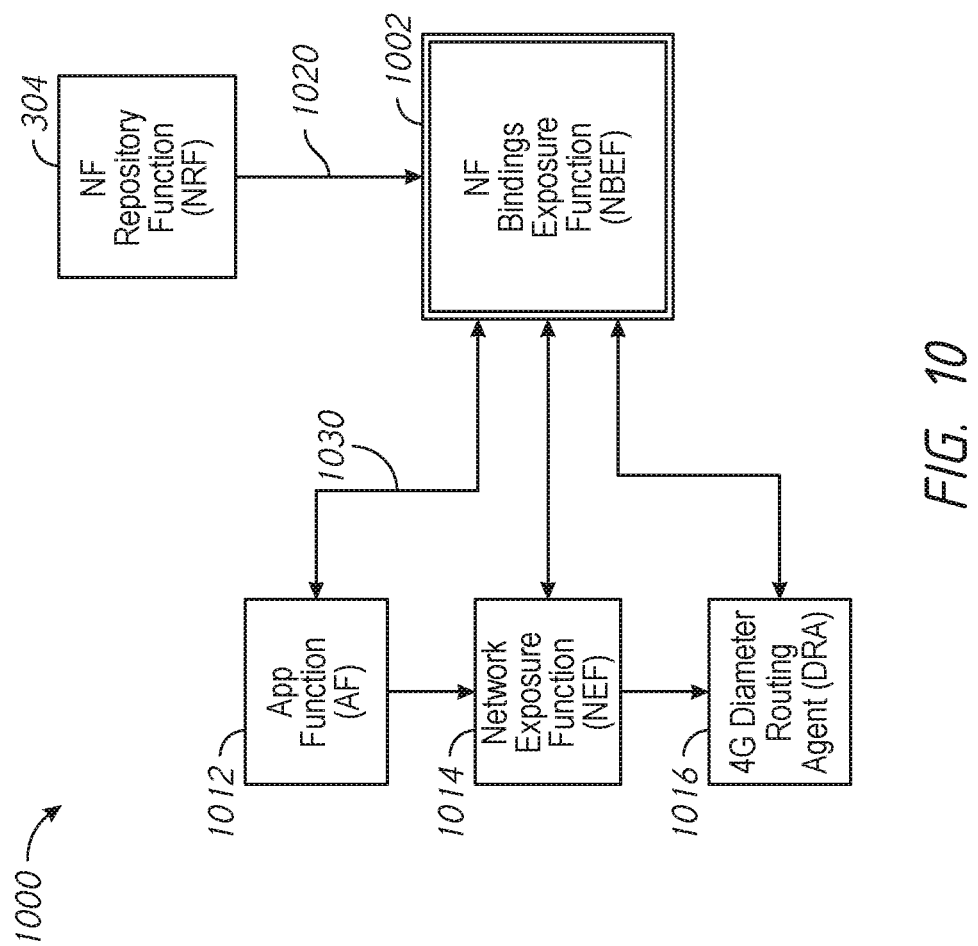
FIG. 10)

FIG. 10 is an illustrative representation of an arrangement of network node functions 1000 for use in the 5G mobile network, which include the NF bindings exposure function (NBEF) 1002 for use in providing information associated with NF instances according to some implementations of the present disclosure. In FIG. 10, the arrangement of network node functions 1000 include the NBEF 1002 as well as an NF repository function (NRF) 304, an application function (AF) 1012, a network exposure function (NEF) 1014, and a (4G) diameter routing agent (DRA). An interface 1020 (e.g. an NBEF-NRF interface) may be provided between NBEF 1002 and NRF 304, an interface 1030 (e.g. an NBEF-AF interface) may be provided between NBEF 1002 and NEF 1014, an interface 1040 (e.g. an NBEF-NEF interface) may be provided between NBEF 1002 and NEF 1014, and an interface 1050 (e.g. an NBEF-DRA interface) may be provided between NBEF 1002 and DRA 1016. Note that the NRF 304 and AF 1012 correspond to those described earlier in relation to FIGS. 1A-1B and 2, with extended functionality as described herein.

Figure 11:
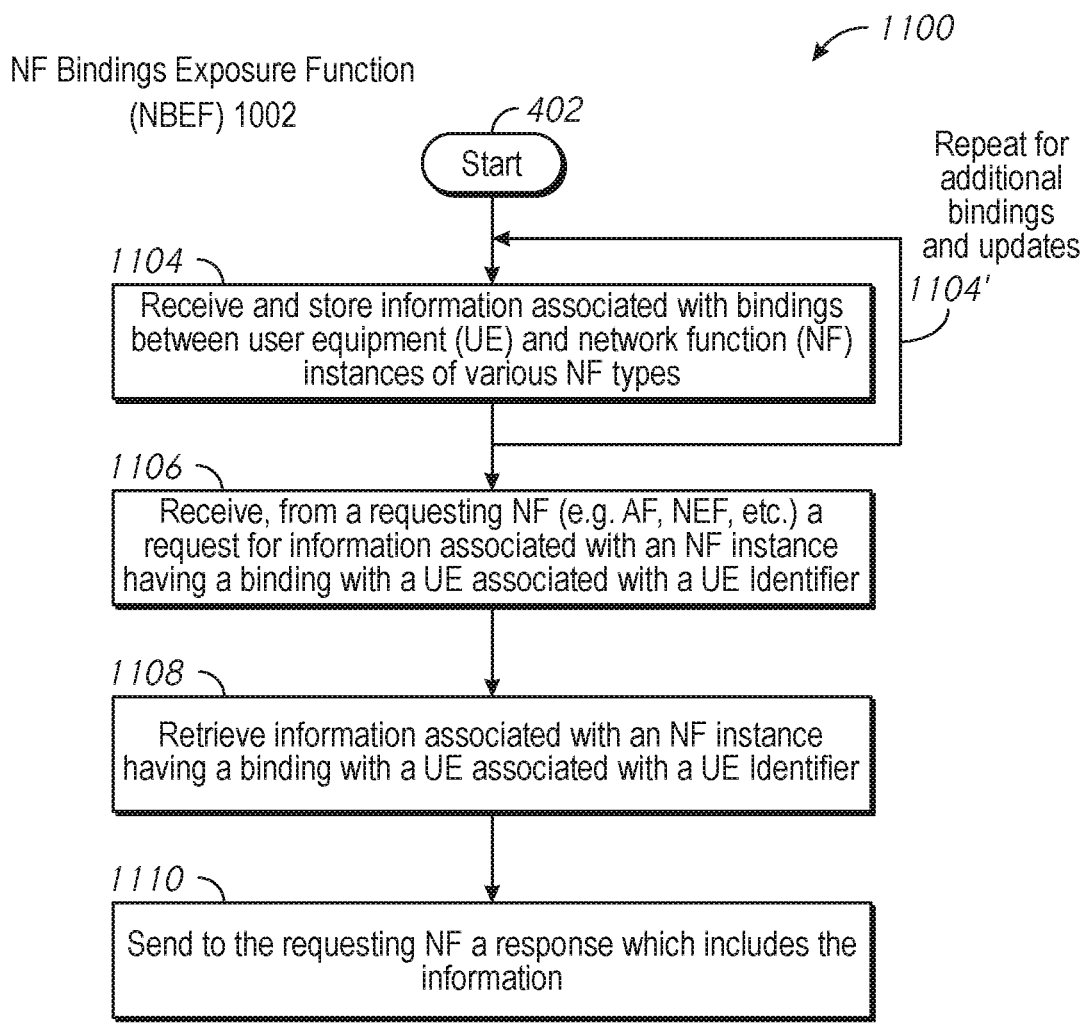
FIG. 11 is a flowchart for describing a method of providing information associated with NF instances for use in the 5G mobile network, which may be performed by an NBEF (see e.g.

FIG. 11 is a flowchart 1100 for describing a method for use in providing information associated with NF instances for use in a 5G mobile network. The method of FIG. 11 may be embodied as and/or performed by an NBEF (e.g. NBEF 1002 of FIG. 10). The method may be executed on a server, network device, or network equipment in the 5G mobile network. The method may be further embodied as a computer program product including a non-transitory computer readable medium and instructions stored in the computer readable medium where the instructions are executable on one or more processors of the server, network device, or network equipment for performing the steps of the method.

Beginning at a start block 1102 of FIG. 11, the NBEF may receive information associated with a binding between a user equipment (UE) and a serving NF instance of the UE and store this information in memory (e.g. a database) (step 1104 of FIG. 11). The NBEF may perform this step together with the step of the NRF as described above in relation step 514 of FIG. 5. This step may be repeated for each one of a plurality of such bindings between UEs and serving NF instances, as well as for updates associated with the bindings (see repeated step 1104' of FIG. 11).

The NBEF may receive, from a requesting NF, a message which indicates a request for information associated with a serving NF instance that has a binding with a UE (step 1106 of FIG. 11). The request may include a UE identifier of the UE, and may also include an indicated NF type of serving NF instance. In response to the request, the NBEF may retrieve, from the memory based on the UE identifier, information associated with the serving NF instance that has the binding with the UE (step 1108 of FIG. 11). The NBEF may then send, to the requesting NF, a message which indicates a response to the request, where the response includes the information associated with the serving NF instance (step 1110 of FIG. 11). The information may be or include identification information of the serving NF instance (e.g. see e.g. FIG. 7) and domain name information (e.g. a fully qualified domain name or FQDN) of the serving NF instance.

Figure 12:
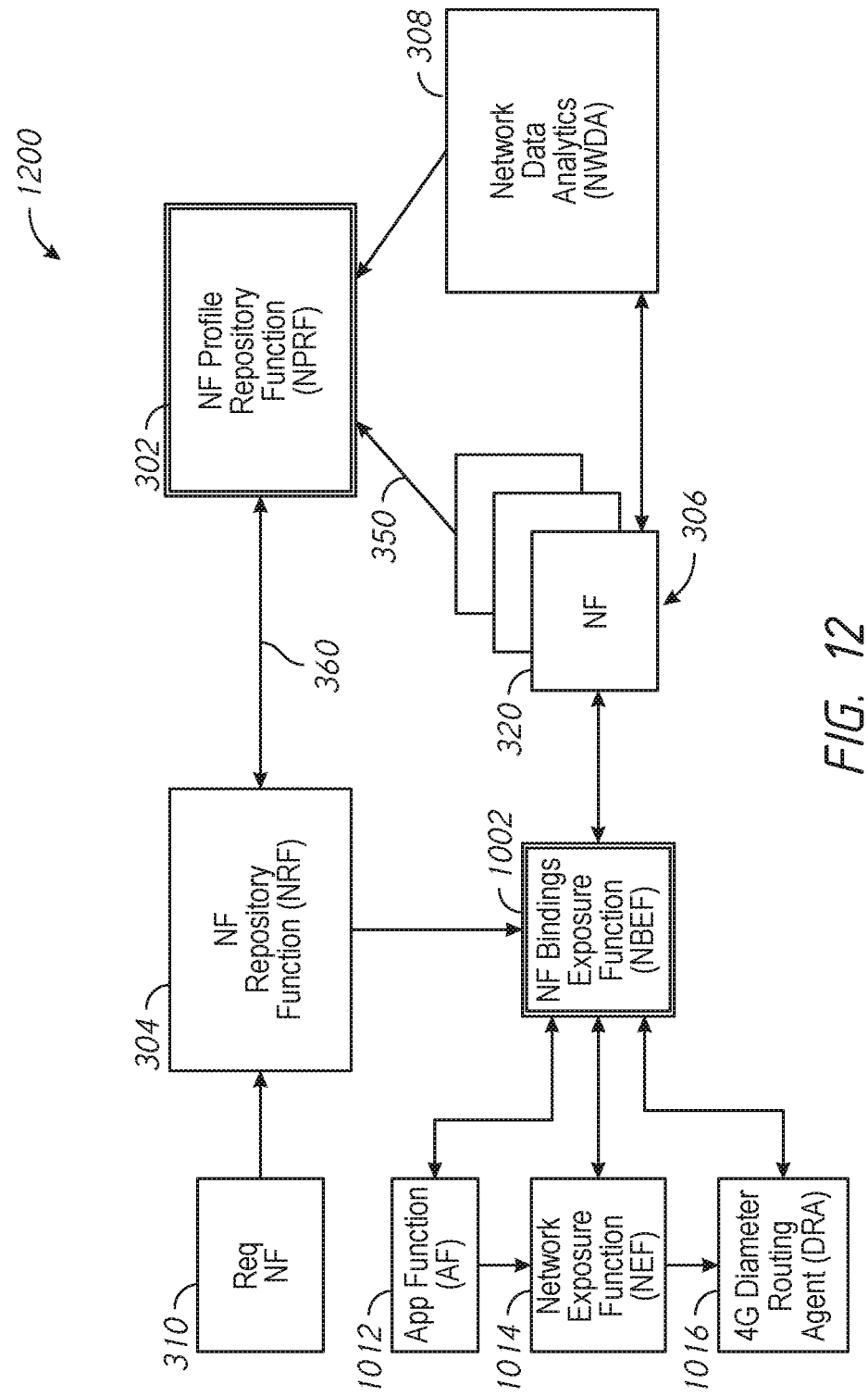
FIG. 12 is an illustrative representation of an arrangement of network node functions for use in the 5G mobile network, including an NPRF and an NBEF provided in combination in the 5G mobile network, for providing information associated with NF instances according to some implementations of the present disclosure (see e.g. the method of FIG. 5)

Moving on again, note that the NPRF and the NBEF may be provided together in the 5G mobile network for enhanced providing of information associated with NF instances, for use in facilitating communication for UEs in the 5G mobile network. Accordingly, FIG. 12 is an illustrative representation of an arrangement of network node functions 1200 for use in the 5G mobile network, which include NPRF 302 and NBEF 1002 provided in combination in the 5G mobile network, for providing information associated with NF instances according to some implementations of the present disclosure (see e.g. the method of FIG. 5).

Figure 13:
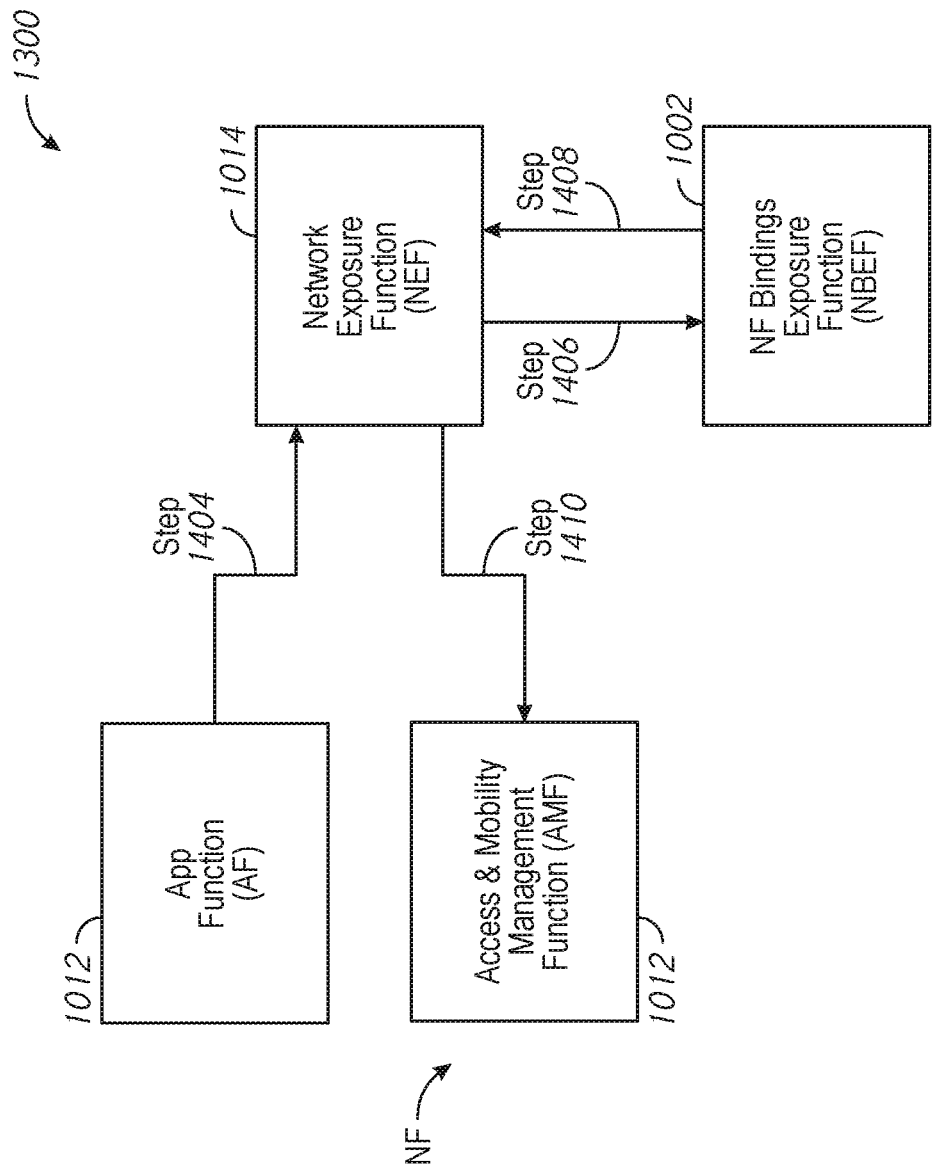
FIG. 13 is an illustrative representation of an arrangement of network node functions for use in the 5G mobile network, including an NBEF and an NF exposure function (NEF) for use in providing information associated with NF instances according to some implementations of the present disclosure (see e.g. the method of FIG. 14)

FIG. 13 is an illustrative representation of an arrangement of network node functions 1300 for use in the 5G mobile network, which include NBEF 1002 and NEF 1014, for use in providing information associated with NF instances according to some implementations of the present disclosure. NEF 1014 of FIG. 13 may operate in accordance with the technique of FIG. 14 described below in detail, together with NBEF 1002 which performs a corresponding technique.

Figure 14:
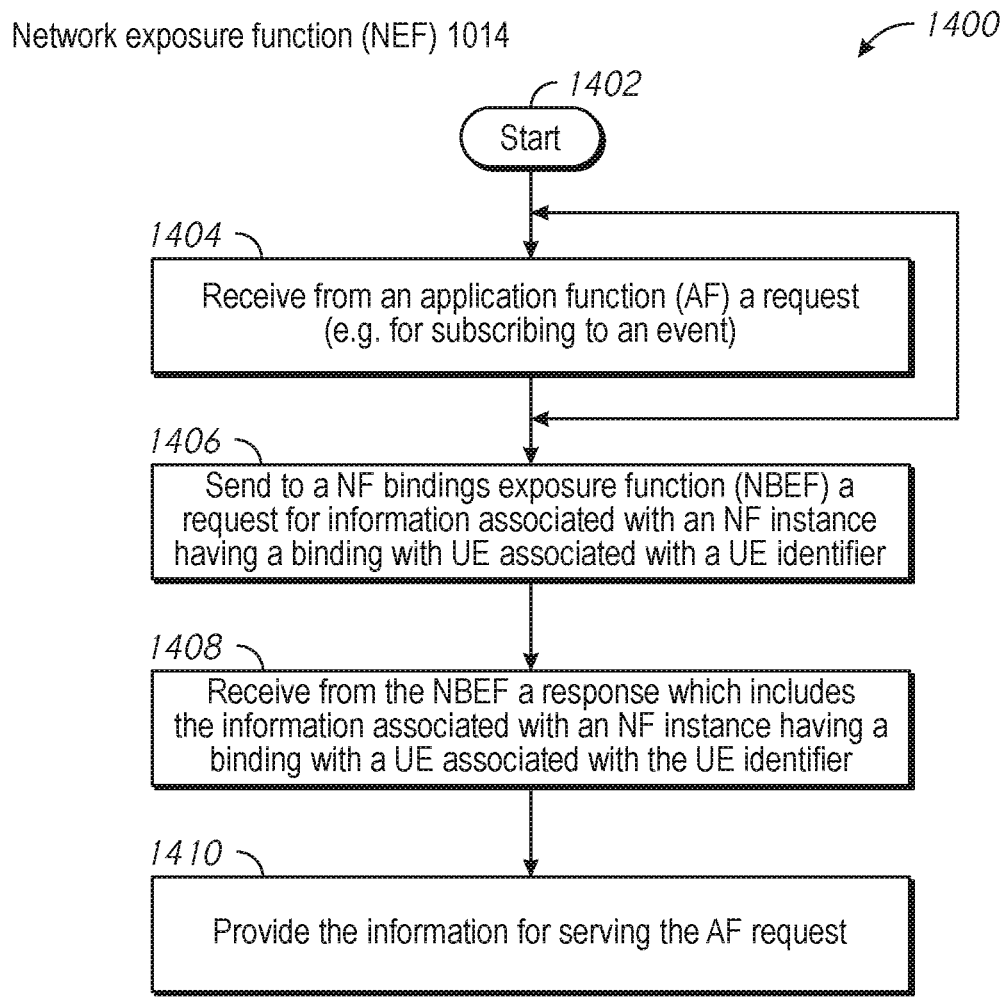
FIG. 14 is a flowchart for describing a method of providing information associated with NF instances for use in the 5G mobile network, which may be performed by an NEF (see e.g.

FIG. 14 is a flowchart 1400 for describing a method for use in providing information associated with NF instances for use in a 5G mobile network. The method may be embodied as and/or performed by an NEF (e.g. NEF 1002 of FIG. 13). The NEF may perform the method together with an AF and an NBEF as described above in relation to FIG. 13 and elsewhere herein. The method may be executed on a server, network device, or network equipment in the 5G mobile network. The method may be further embodied as a computer program product including a non-transitory computer readable medium and instructions stored in the computer readable medium where the instructions are executable on one or more processors of the server, network device, or network equipment for performing the steps of the method.

Beginning at a start block 1400 of FIG. 14, the NEF may receive from an AF a message which indicates a request or registration for a service (step 1404 of FIG. 4). The request may be, for example, a request to subscribe to notifications for detected events associated with a UE. Here, one or more event notifications for the UE may be for a UE attach to the 5G mobile network and/or a UE detach from the 5G mobile network; the AF may be configured to send data to the UE in response to UE attach and to refrain from sending data to the UE in response to UE detach. The NEF will serve the request from the AF (i.e. the NEF will facilitate the registration on behalf of the AF). In order to serve the request, however, the NEF may need to identify one or more currently-serving NF instances of the UE. For example, the NEF may need to identify the currently-serving AMF instance of the UE for configuration.

Thus, in response to receipt of the request, the NEF may send to the NBEF a message which indicates a request for information associated with a serving NF instance having a binding with the UE (step 1406 of FIG. 14). The request may include a UE identifier of the UE, and may further include an indicated NF type (e.g. AMF type) of the serving NF instance. The NEF may receive from the NBEF a message which indicates a response to the request, where the response includes the information associated with the serving NF instance having the binding with the UE (step 1408 of FIG. 14). The NEF may then provide, use, and/or send the information for serving the request of the AF (step 1410 of FIG. 14). For example, the NEF may send a message to the serving AMF instance of the UE so that it is configured to facilitate event notifications for the subscribed events.

Figure 15B:
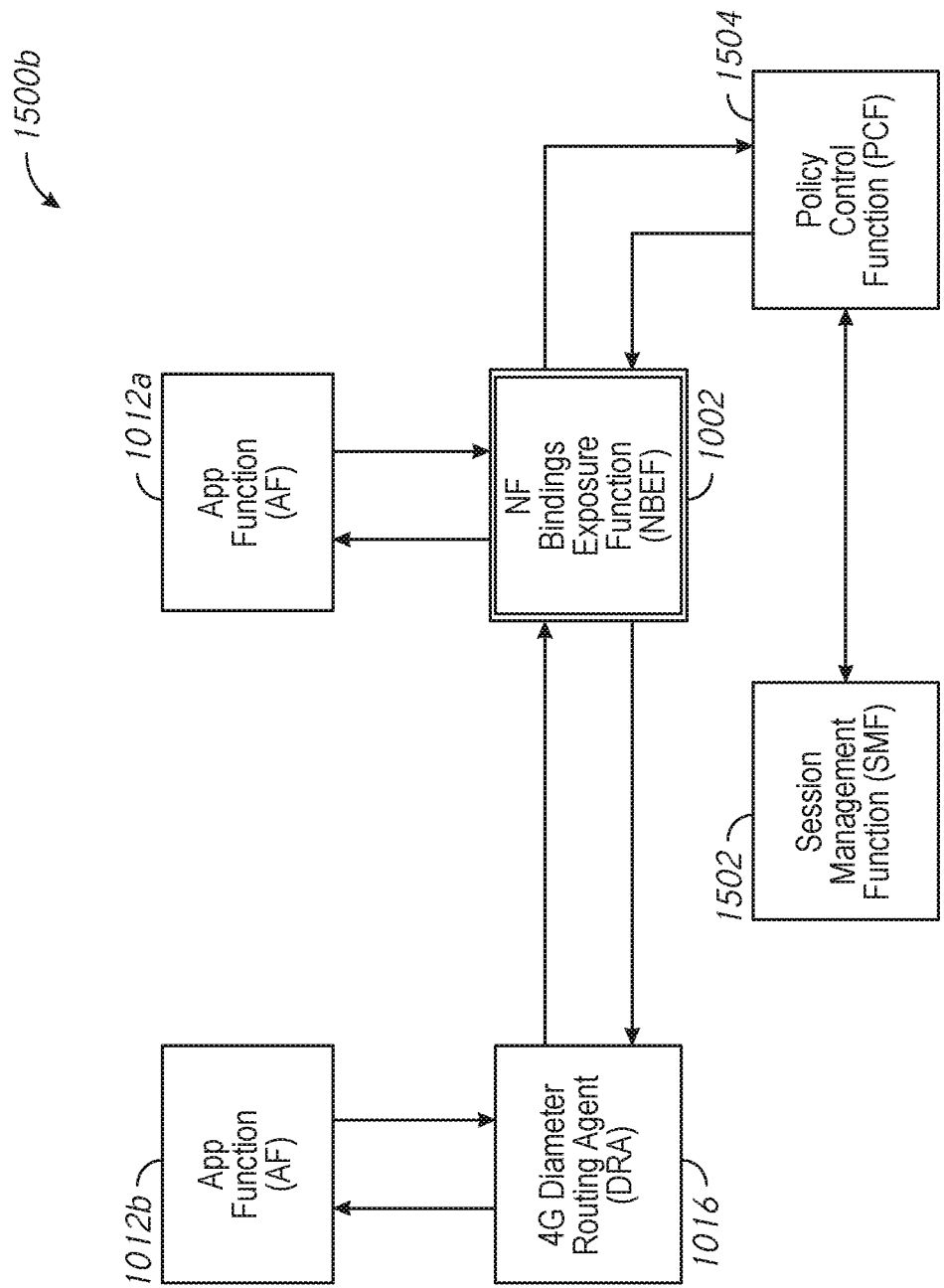

FIGS. 15A and 15B are illustrative representations of arrangements 1500a and 1500b of network node functions of the 5G mobile network, which include NBEF 1002 for use in providing information associated with NF instances according to some implementations of the present disclosure. In FIG. 15A, the arrangement 1500a of network node functions include the NBEF 1002 as well as AF 1012a, SMF 1502, and PCF 1504 as shown. The arrangement 1500b of FIG. 15B is the same as or similar to the arrangement 1500a of FIG. 15A, except that arrangement 1500b of FIG. 15B is enhanced to accommodate 4G/LTE networks with a DRA 1016 for an AF 1012b. NBEF 1002 of FIGS. 15A and 15B may operate in accordance with the technique of FIG. 16 described below. Note that the PCF 1504 corresponds to the PCF described in relation to FIGS. 1A-1B and 2, with extended functionality as described herein.

Figure 16:
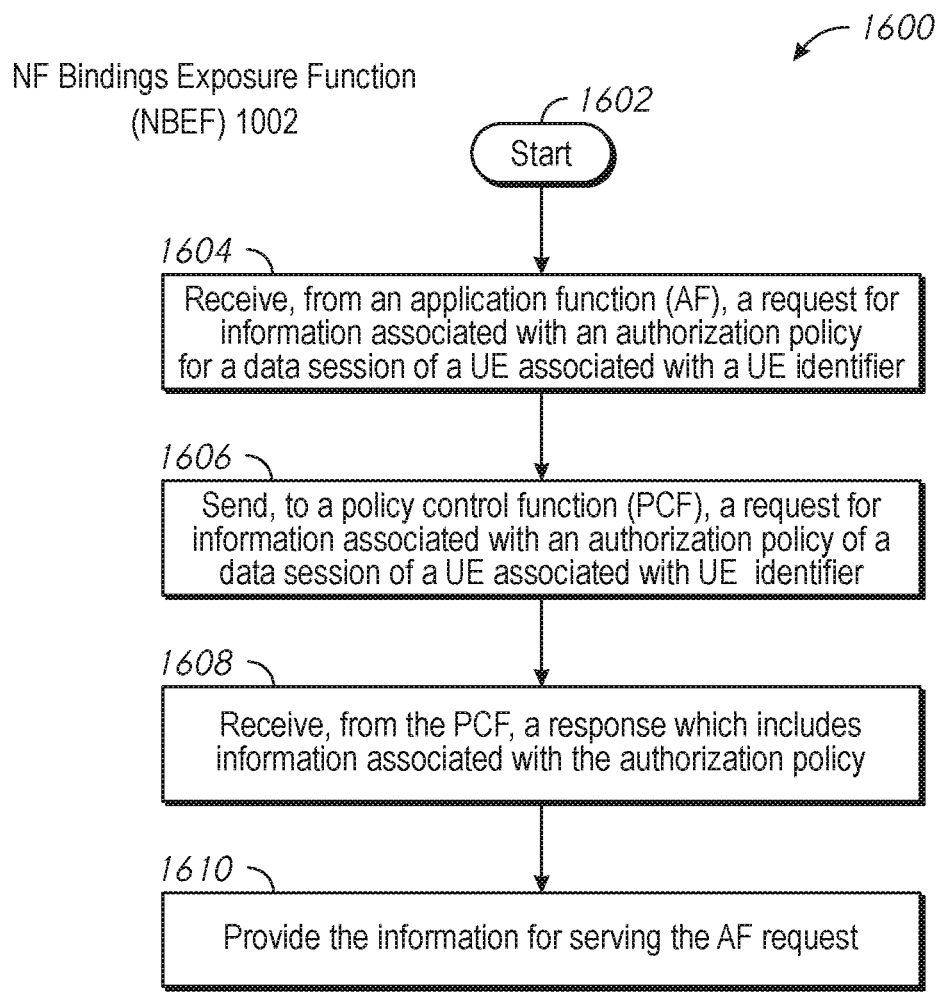
FIG. 16 is a flowchart for describing a method of providing information associated with NF instances for use in a 5G mobile network, for facilitating communication for UEs, which may be performed by an NBEF (see e.g.

FIG. 16 is a flowchart 1600 for describing a method for use in providing information associated with NF instances for facilitating communications for UEs, for use in a 5G mobile network. The method may be embodied as and/or performed by an NBEF (e.g. NBEF of FIGS. 15A and 15B) of the 5G mobile network. The NBEF may perform the method in cooperation with an AF and a PCF which perform a corresponding method. The method of the NBEF may be executed on a server, network device, or network equipment in the 5G mobile network. The method may be further embodied as a computer program product including a non-transitory computer readable medium and instructions stored in the computer readable medium where the instructions are executable on one or more processors of the server, network device, or network equipment for performing the steps of the method.

Figure 17:
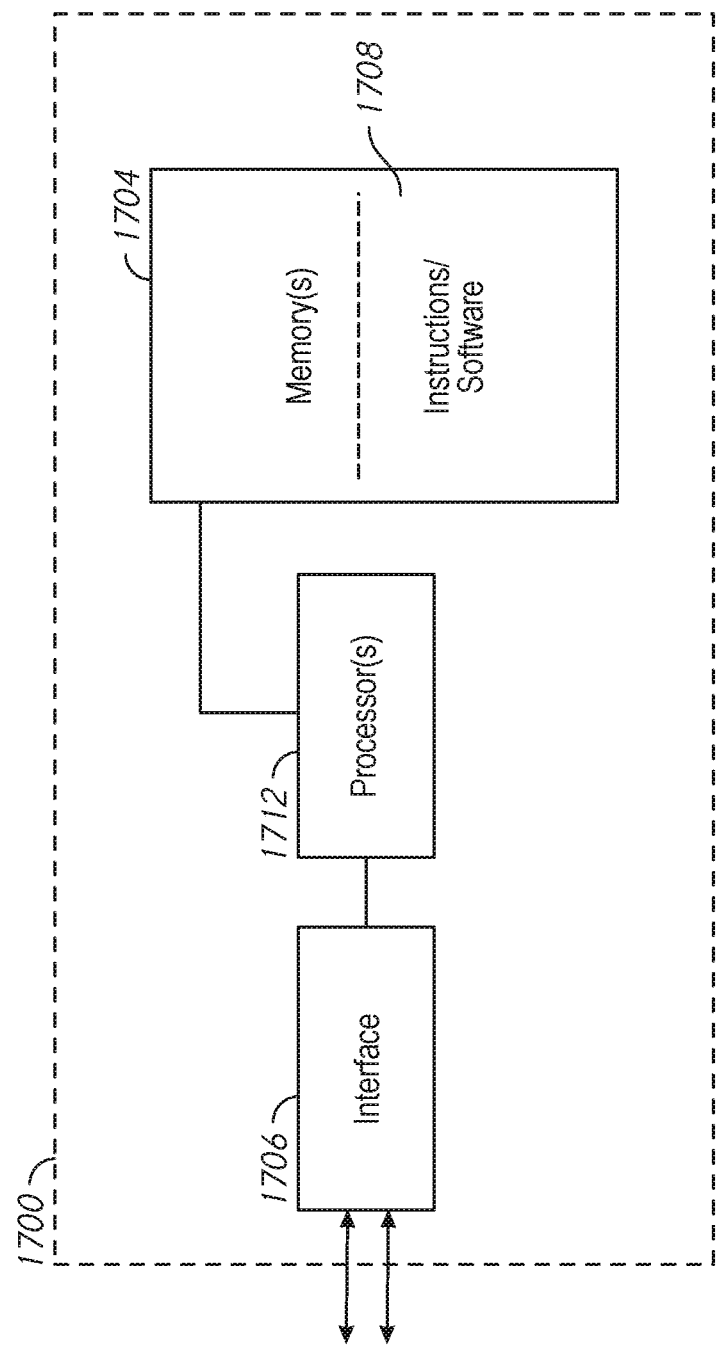
FIG. 17 is an illustrative representation of basic relevant components of a server, network device, network element, or network equipment for use in a 5G mobile network according to some implementations of the present disclosure.

Prior to the method of FIG. 16, a data session is established for a UE. The data session (e.g. a PDU session) may be controlled and/or managed by an SMF in accordance with an authorization policy obtained from a PCF. Beginning at a start block 1602 of FIG. 16, the NBEF may receive from an application function (AF) a message which indicates a request (step 1604 of FIG. 16). The request may be or include a request for information associated with the authorization policy for the data session of the UE. The request may include a UE identifier of the UE, an IP address of the UE, and QoS parameters. In response to the request, the NBEF may send, to the PCF, a message which indicates a corresponding request for information associated with the authorization policy (step 1606 of FIG. 16). The NBEF may identify the appropriate PCF for the UE based on the stored binding information. The corresponding request may include the UE identifier of the UE, the IP address of the UE, and the QoS parameters. The NBEF may receive, from the PCF, the information associated with the authorization policy FIG. 17 is an illustrative representation of basic relevant components of a server, network device, network element, or network equipment 1700 for use in a 5G mobile network according to some implementations of the present disclosure. The components may include one or more processors 1712 coupled to one or more memories 1704 and to a network interface 1706. Interface 1706 may be configured to connect to a network for communications. The one or more processors 1706 are configured to operate in accordance with program instructions/software 1708 (e.g. one or more virtualized network functions (VNFs) or network function virtualizations (NFVs) stored in the one or more memories 1704, in order to perform basic operations as well as to perform techniques of the present disclosure. Relatedly, a computer program product may include a non-transitory computer-readable medium (e.g. memory, a computer disk, etc.) and program instructions (e.g. one or more VNFs or NFVs) stored in the non-transitory computer-readable medium such that, when executed by one or more processors 1712, may perform the techniques of the present disclosure.

Thus, methods and apparatus for providing information (e.g. identification, service, status, and/or bindings information) associated with network function (NF) instances in a 5G mobile network, for use in facilitating communications for UEs in the 5G mobile network, have been described.

In one illustrative example of the present disclosure, an NF profile repository function (NPRF) is provided to receive, for each one of a plurality of NF instances of a plurality of different NF types, information associated with the NF instance and store this information in memory. The different NF types of NF instances may include, for example, an access and mobility management function (AMF), a session management function (SMF), and a policy control function (PCF). The NPRF may then receive, from an NF repository function (NRF), a message which indicates a request for information associated with one or more NF instances of an indicated NF type. In response, the NPRF may retrieve, from the memory based on the indicated NF type, information associated with the one or more NF instances. The NPRF may send, to the NRF, a message which indicates a response to the request, where the response includes retrieved information associated with the one or more NF instances. In some implementations, information for each NF instance may be or include identification information which indicates an NF instance identifier (ID) of the NF instance, one or more service indications each indicative of a service provided by the NF instance, an availability indication which indicates a current availability of the NF instance, and/or a loading indication which indicates a current loading of the NF instance.

In some implementations of the present disclosure, an NF bindings exposure function (NBEF) is alternatively or additionally provided in the 5G mobile network. The NBEF may receive information associated with a binding between a user equipment (UE) and a serving network function (NF) instance of the UE and store this information in memory, for each one of a plurality of such bindings between UEs and serving NF instances. The NBEF may also receive, from a requesting NF, a message which indicates a request for information associated with a serving NF instance of a UE, where the request includes a UE identifier of the UE. The NBEF may retrieve, from the memory based on the UE identifier, information associated with the serving NF instance of the UE. The NBEF may send, to the requesting NF, a message which indicates a response to the request, where the response includes the information associated with the NF instance. The information may be or include identification information of the serving NF instance and domain name information (e.g. a fully qualified domain name or FQDN) of the serving NF instance.

Note that the components and techniques shown and described in relation to the separate figures may indeed be provided as separate components and techniques, and alternatively one or more (or all of) the components and techniques shown and described in relation to the separate figures are provided together for operation in a cooperative manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first UE could be termed a second UE, and, similarly, a second UE could be termed a first UE, without changing the meaning of the description, so long as all occurrences of the "first UE" are renamed consistently and all occurrences of the second UE are renamed consistently. The first UE and the second UE are both UEs, but they are not the same UE.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
   at a repository function,
      for each one of a plurality of network function (NF) instances, receiving information associated with the NF instance and storing the information in memory, the information including at least identification information associated with the NF instance;
      for each one of the plurality of NF instances, receiving a loading indication of the NF instance from a network data analytics function, the loading indication indicating a current loading of the NF instance;

receiving, from a NF repository function (NRF), a message which indicates a request for information associated with one or more NF instances of an indicated NF type;

retrieving, from the memory and based on the indicated NF type, information associated with the one or more NF instances of the indicated NF type; and sending, to the NRF, a message which indicates a response to the request, the response including the retrieved information associated with the one or more NF instances of the indicated NF type, the retrieved information including at least the identification information and the loading indication for each one of the one or more NF instances of the indicated NF type.

2. The method of claim 1, wherein receiving and storing the information further comprises receiving and storing information which includes profile information associated with the NF instance, the method further comprising:

at the repository function, receiving, from the NRF, a message which indicates a request for profile information associated with one or more NF instances of an indicated NF type;

retrieving, from the memory and based on the indicated NF type, profile information associated with the one or more NF instances of the indicated NF type; and sending, to the NRF, a message which indicates a response to the request, the response including the retrieved profile information associated with each one of the one or more NF instances of the indicated NF type.

3. The method of claim 1, wherein the identification information associated with the NF instance includes an NF instance identifier (ID) which identifies the NF instance.

4. The method of claim 1, wherein receiving and storing the information further comprises receiving and storing information which includes a list of services associated with the NF instance, the method further comprising:

at the repository function, receiving, from the NRF, a message which indicates a request for a list of services associated with one or more NF instances of an indicated NF type;

retrieving, from the memory and based on the indicated NF type, the list of services associated with the one or more NF instances of the indicated NF type; and sending, to the NRF, a message which indicates a response to the request, the response including the retrieved list of services associated with each one of the one or more NF instances of the indicated NF type.

5. The method of claim 1, further comprising:

for each one of the plurality of NF instances, receiving an availability indication of the NF instance from the network data analytics function; and wherein the retrieved information further includes the availability indication which indicates a current availability of the respective NF instance.

6. The method of claim 1, wherein the one or more NF instances of the indicated NF type comprise a selected plurality of NF instances of the indicated NF type.

7. The method of claim 1, wherein the plurality of NF instances are of each NF type of a plurality of NF types which include an access and mobility management function (AMF), a session management function (SMF), and a policy control function (PCF).

8. Network equipment for use in a mobile network, the network equipment comprising:

one or more processors;

one or more non-transitory memories;

program instructions stored in the one or more non-transitory memories, the program instructions comprising a repository function;

one or more interfaces for communication with a network function (NF) repository function (NRF) and a network data analytics function;

the one or more processors being operative in accordance with the program instructions comprising the repository function to:

for each one of a plurality of NF instances, receive information associated with an NF instance and store the information in memory, the information including at least identification information associated with the NF instance;

for each one of the plurality of NF instances, receive a loading indication of the NF instance from the network data analytics function, the loading indication indicating a current loading of the NF instance;

receive, from the NRF, a message which indicates a request for information associated with a selected plurality of NF instances of an indicated NF type;

retrieve, from the memory, information associated with the selected plurality of NF instances based on the indicated NF type; and cause a message which indicates a response to the request to be sent to the NRF, the response including the retrieved information associated with the selected plurality of NF instances, the retrieved information including at least the identification information and the loading indication for each NF instance of the selected plurality of NF instances of the indicated NF type.

9. The network equipment of claim 8, further comprising:

wherein the plurality of NF instances are of each NF type of a plurality of NF types which include an access and mobility management function (AMF), a session management function (SMF), and a policy control function (PCF);

wherein receiving and storing the information further comprises receiving and storing information which includes a list of services associated with the NF instance;

wherein the one or more processors are further operative in accordance with the program instructions comprising the repository function to:

receive, from the NRF, a message which indicates a request for a list of services associated with the selected plurality of NF instances of an indicated NF type;

retrieve, from the memory and based on the indicated NF type, the list of services associated with the selected plurality of NF instances of the indicated NF type; and send, to the NRF, a message which indicates a response to the request, the response including the retrieved list of services associated with each NF instance of the selected plurality of NF instances of the indicated NF type.

10. A method comprising:

at a network function (NF) repository function (NRF), receiving, from a requesting NF, a message which indicates a discovery request for an NF instance corresponding to an indicated NF type;

sending, to a network profile repository function, a message which indicates a request for information associated with one or more NF instances corresponding to the indicated NF type;

receiving, from the network profile repository function, a message which indicates a response to the request, the response including the information associated with the one or more NF instances corresponding to the indicated NF type; and sending, to the requesting NF, a message which indicates a discovery response to the discovery request, the message including the information associated with a selected one of the one or more NF instances corresponding to the indicated NF type.

11. The method of claim 10, wherein the information comprises an availability indication which indicates a current availability of the NF instance or a loading indication which indicates a current loading of the NF instance.

12. The method of claim 10, wherein the information comprises one or more service indications of the NF instance, wherein each service indication is indicative of a service provided by the NF instance.

13. The method of claim 10, further comprising:
based on the response including the information associated with at least two NF instances corresponding to the indicated NF type, selecting by the NRF, one of the at least two NF instances as a serving NF instance of a data session of a user equipment,
wherein the selecting is based on at least one of service indication, availability indication, and loading indication included in the information associated with the at least two NF instances, and
wherein the indicated NF type comprises one of an access and mobility management function (AMF), a session management function (SMF), or a policy control function (PCF).

14. The method of claim 10, further comprising:
selecting the NF instance based on the retrieved information, for use as a serving NF instance of a user equipment (UE) identified by a UE identifier.

15. The method of claim 14, further comprising:
sending, to an NF bindings exposure function, information associated with a binding between the UE and the serving NF instance for storage.

16. The method of claim 10, wherein the information comprises identification information associated with the NF instance, the identification information including an NF instance identifier (ID) which identifies the NF instance.

17. A method comprising:
at a network function (NF) binding exposure function,
receiving, from a NF repository function (NRF), information associated with a binding between a user equipment (UE) and a serving NF instance of the UE and storing the information in memory, for each one of a plurality of such bindings between UEs and serving NF instances;
receiving, from a requesting NF, a message which indicates a request for information associated with a serving NF instance of a UE, the request including a UE identifier of the UE;
retrieving, from the memory based on the UE identifier, information associated with the serving NF instance of the UE; and
sending, to the requesting NF, a message which indicates a response to the request, the response including the information associated with the NF instance.

18. The method of claim 17, wherein the information includes identification information of the serving NF instance and domain name information of the serving NF instance.

19. The method of claim 17, wherein the request further includes an indicated NF type indicating one of an access and mobility management function (AMF), a session management function (SMF), or a policy control function (PCF).

20. The method of claim 17, wherein the requesting NF comprises an application function (AF) or a network exposure function (NEF).

* * * * *